United States Patent
Thibault

(10) Patent No.: US 9,073,634 B2
(45) Date of Patent: Jul. 7, 2015

(54) ELECTROMECHANICAL BRAKING SYSTEM ARCHITECTURE

(71) Applicant: MESSIER-BUGATTI-DOWTY, Velizy-Villacoublay (FR)

(72) Inventor: Julien Thibault, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/045,510

(22) Filed: Oct. 3, 2013

(65) Prior Publication Data

US 2014/0100719 A1    Apr. 10, 2014

(30) Foreign Application Priority Data

Oct. 9, 2012 (FR) ...................................... 12 59633

(51) Int. Cl.
*B64C 25/46* (2006.01)
*B60T 8/17* (2006.01)
*B60T 8/88* (2006.01)

(52) U.S. Cl.
CPC ............... *B64C 25/46* (2013.01); *B60T 8/1703* (2013.01)

(58) Field of Classification Search
USPC .............. 701/3, 70, 14; 188/106 R; 303/3, 20
See application file for complete search history.

(56) References Cited

U.S. PATENT DOCUMENTS

| | | | |
|---|---|---|---|
| 6,296,325 B1* | 10/2001 | Corio et al. ...................... 303/20 |
| 2005/0189814 A1* | 9/2005 | Mallevais et al. ................. 303/3 |
| 2008/0258548 A1* | 10/2008 | May et al. ...................... 303/139 |
| 2009/0278401 A1* | 11/2009 | Summers et al. ............... 303/20 |
| 2012/0065816 A1* | 3/2012 | Cahill ............................... 701/3 |

FOREIGN PATENT DOCUMENTS

| | | |
|---|---|---|
| EP | 1 547 918 A1 | 6/2005 |
| FR | 2 952 009 A1 | 5/2011 |
| FR | 2 964 625 A1 | 3/2012 |

* cited by examiner

*Primary Examiner* — Tan Q Nguyen
(74) *Attorney, Agent, or Firm* — Sughrue Mion, PLLC

(57) ABSTRACT

The invention relates to a braking system architecture for an aircraft having wheels 1 braked by means of respective brakes 2, each brake having a plurality of electromechanical actuators 3a, 3b, the braking system having controllers 8a, 8b for distributing electric power Ps to the actuators 3a, 3b in response to a braking setpoint, each controller 8a, 8b being associated with some of the actuators of any given brake. According to the invention, each controller 8a, 8b has an input Ev for receiving information about the rotary speed of the wheel 1 braked by the actuators associated with said controller, the controller including processor means 13 for modulating the power transmitted to the actuators as a function of the speed of rotation of the wheel in order to provide anti-skid protection.

4 Claims, 1 Drawing Sheet

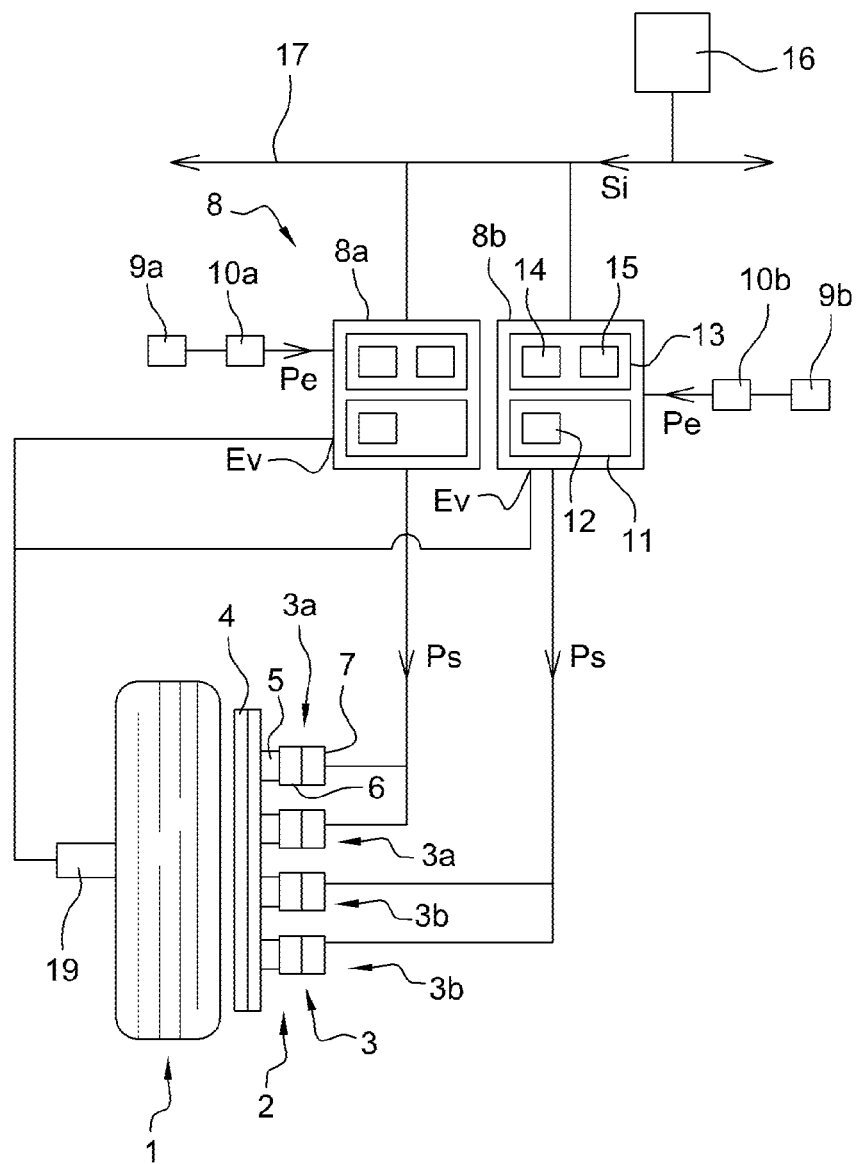

ELECTROMECHANICAL BRAKING SYSTEM ARCHITECTURE

The invention relates to an architecture for an aircraft braking system having wheels that are braked by means of brakes having electromechanical actuators.

BACKGROUND OF THE INVENTION

Electromechanical aircraft braking system architectures are known, in particular from documents FR 2 964 625 and FR 2 952 009, that include a certain number of actuator controllers (also known as electromechanical actuator controllers or EMACs) and braking computers (or brake system controllers (BSCs), or electronic braking control units (EBCUs), and in which the electromechanical actuators of the brake of each wheel fitted with a brake (i.e. each "braked" wheel) are grouped together in two complementary groups such that a first group of actuators is controlled by a first controller that controls those actuators only, and a second group of actuators is controlled by a second controller that controls those actuators only.

The actuators of each brake are dimensioned so that in the event of one controller failing, the actuators of the same brake that are controlled by the other controller are capable of compensating for the failure, at least in part, so as to enable the aircraft to be braked safely.

In such architectures, each controller is electrically connected to at least one braking computer, possibly via a remote data concentrator (RDC), as described in document FR 2 964 625. An anti-skid protection function (also known as an "anti-lock" protection function) serves to relax the braking force in the event of a braked wheel skidding, and this function is performed in the braking computers. For this purpose, each braked wheel has a sensor for sensing the rotary speed of the wheel, which sensor is connected either to a single braking computer, or else to a single data concentrator that transmits the speed of rotation to one or more braking computers.

Such architectures present two main drawbacks.

Firstly, it is found that a failure of the braking computer or of the data concentrator to which the speed sensor of a wheel is connected leads to a total loss of the anti-skid protection function for said wheel.

In addition, in an architecture where both controllers associated with a braked wheel are connected to a single braking computer, a failure of the braking computer leads to a total loss of braking on that wheel. In order to guarantee satisfactory braking reliability, it is therefore necessary to use at least two braking computers, each of which is connected to all of the controllers, possibly via data concentrators as described in document FR 2 964 625, in which two braking computers are connected via two data concentrators to eight controllers that control sixteen actuators distributed over four wheels. Naturally, that solution is expensive and not very advantageous in terms of weight, given the numerous pieces of equipment and the associated cabling.

Object of the Invention

An object of the invention is to provide a braking architecture that guarantees satisfactory reliability both of the braking system and of the anti-skid protection function, without increasing the number of pieces of equipment making up the system.

Summary of the Invention

In order to achieve this object, the invention provides a braking system architecture for an aircraft having wheels braked by means of respective brakes, each brake having a plurality of electromechanical actuators, the braking system having controllers for distributing electric power to the actuators in response to a braking setpoint, each controller being associated with some of the actuators of any given brake. According to the invention, each controller has an input for receiving information about the rotary speed of the wheel braked by the actuators associated with said controller, the controller including processor means for modulating the power transmitted to the actuators as a function of the speed of rotation of the wheel in order to provide anti-skid protection.

The controllers (or EMACs) are thus arranged to perform an anti-skid protection function that is conventionally performed in a braking computer. This function may be implemented in a controller without major hardware modification, since conventional controllers possess a large amount of calculation power in order to be able to control the electric motors of the actuators. It is thus possible to provide redundancy for the functions that are conventionally performed by a controller and a braking computer while using only two controllers.

The invention also provides an architecture as described above, wherein the actuators of any given brake are grouped together in first and second complementary actuator groups so that the actuators of the first group are controlled by a first controller that controls those actuators only and so that the actuators of the second group are controlled by a controller that controls those actuators only, and wherein both of the first and second controllers receive the information about the speed of rotation of the braked wheel.

This guarantees satisfactory reliability both for the braking system and for the anti-skid protection function. Typically, a failure of one wheel brake controller leads to only partial loss of braking on that wheel, and this may be compensated by the actuators of the other controller of its brake. Furthermore, since both controllers are connected to the rotary speed sensor of the wheel, the controller that has not failed can still provide anti-skid protection, and can apply it to the remaining actuators under its control.

Finally, the invention provides an architecture in accordance with the architecture described above, wherein the first and second controllers are both connected directly to a rotary speed sensor that transmits information to them about the speed of rotation of the braked wheel.

Thus, the information about speed of rotation does not pass via a data concentrator, thereby serving to reduce the time required for transmitting speed information and improving the accuracy of the anti-skid protection function.

BRIEF DESCRIPTION OF THE DRAWING

The invention can be understood in the light of the following description made with reference to the sole FIGURE showing a brake architecture in a particular embodiment of the invention.

DETAILED DESCRIPTION OF THE INVENTION

The brake system architecture of the invention is described below with reference to an aircraft having a plurality of undercarriages fitted with braked wheels similar to the undercarriage shown in the sole FIGURE. Each braked wheel 1 has an electromechanical brake 2 made up in this example of four electromechanical actuators 3, specifically two actuators 3a and two actuators 3b adapted to press selectively against a facing stack of disks 4. Each actuator 3 has a pusher 5 driven by an electric motor 6 and is fitted with a parking blocking member 7 that enables the pusher 5 to be blocked in position when the actuator 3 has been blocked in order to exert a parking force on the disk 4.

The architecture in this example has two actuator controllers (or EMACs) 8, specifically a first controller 8a and a second controller 8b, each associated with each of the wheels 1, each controller 8 receiving input electric power Pe coming from first and second alternating current (AC) power buses 9a and 9b of the aircraft, via respective power supply converters 10a and 10b that transform the AC power into direct current (DC) power.

The two actuators 3a are electrically connected to the first controller 8a and they are controlled by the first controller 8a, which does not control any other actuator, and the two actuators 3b of the brake 2 are electrically connected to the second controller 8b and they are controlled by the second controller 8b, which does not control any other actuator.

Each controller 8 includes a power unit 11 comprising an inverter 12, together with processor means 13 comprising a control module 14 and a calculation module 15.

The power unit 11 serves to transform the input electric power Pe into three-phase power Ps adapted to controlling the electric motors 6 of the actuators 3a and 3b, and to modulating the three-phase power Ps in response to a braking order delivered by the control module 14.

The braking orders delivered by the control module 14 are prepared as a function of signals Si representative of braking instructions from the cockpit 16. The signals representative of braking instructions are transmitted to the controllers 8a and 8b by a digital bus 17 to which each controller 8a, 8b is connected.

In a "parking" mode of braking, the control module 14 directly receives a parking brake instruction issued as a result of the pilot actuating a parking selector, and generates a parking braking order so that the power unit 11 powers the electric motors 6 of the actuators 3a, 3b to cause them to apply a predetermined parking force on the stack of disks 4, after which each actuator 3a, 3b has the blocking member 7 of its pusher 5 actuated to block the pusher 5 in position after the parking force has been applied, with these steps being repeated regularly in order to adjust the parking force, given that this force may have diminished, in particular as a result of the brake being subjected to heating and expansion during braking, and subsequently shrinking on cooling.

In a "normal" braking mode, the calculation module 15 receives a normal braking instruction and generates a braking setpoint for use by the control module 14. This normal braking instruction is used as a result of the pilot actuating brake pedals or an autobrake lever for controlling automatic braking, or indeed the instruction may come from some other equipment of the aircraft, e.g. an autopilot computer. The normal braking instruction is corrected by the calculation unit 15 applying an anti-skid protection function for the purpose of relaxing the normal braking force on the wheel 1 in the event of it skidding.

For this purpose, each controller 8a, 8b receives a speed measurement representative of the speed of the wheel 1 via a speed sensor input Ev. The speed measurement is delivered by a speed sensor 19 of the wheel (e.g. a sensor of the magnetic tachometer type), and in this example it is connected directly to both of the controllers 8a and 8b associated with the wheel 1.

Thus, in the architecture of the invention, each controller 8a, 8b performs both the functions that are performed by a conventional controller and also the functions that are performed by a conventional braking computer.

Since conventional controllers have processor means of considerable calculation capacity, as is required for controlling the electric motors of the actuators, it is relatively easy to add an anti-skid protection function. At the hardware level, the main difference between the controllers 8a, 8b described herein and a conventional controller thus lies in adding the speed sensor input Ev.

It should be observed that in the event of one of the controllers 8a or 8b failing, the braking of the wheel 1 continues to be performed by the remaining controller, which controls two of the actuators 3a or 3b out of the four actuators of the electromechanical brake 2 of the wheel 1. Provision is made for compensating for such a failure in part by calling on the actuators that continue to be powered to deliver extra braking force. Thus, each actuator 3a, 3b is dimensioned so as to be capable, at least occasionally, of developing a braking force equivalent to that developed by two actuators of a brake in which all of the actuators are powered during braking under nominal conditions.

In addition, since each controller 8a, 8b is connected to the speed sensor 19, a failure of one controller does not prevent the other controller from applying the anti-skid protection function in order to control the braking force as a function of skidding. The availability of the anti-skid protection function is thus improved over a conventional architecture.

The invention is not limited to the particular embodiment described above, but on the contrary covers any variant coming within the ambit of the invention as defined by the claims.

Although the invention is described in the context of a wheel brake having four actuators connected to two controllers, the invention naturally applies to some other number of actuators connected to some other number of controllers, each controller being connected to some of the actuators of any given brake.

Although the invention is illustrated with the sensor for sensing the rotary speed of the wheel being connected directly to the controllers, it is naturally possible to connect the sensor to the controllers via equipment of the stator concentrator type, with the speed information then possibly being transmitted via the digital data bus.

Although each braked wheel is described as having a single sensor for sensing the rotary speed of the wheel, it would naturally be possible to provide each wheel with a plurality of speed sensors, each sensor being connected to a single controller and independently transmitting to the controller to which it is connected information about the rotary speed of the wheel (i.e. via a communication channel that is different from a channel used by another sensor). Thus, by fitting a wheel with two speed sensors, and by connecting each sensor independently to a respective single controller, the availability of the anti-skid protection function is improved, so that in the event of one of the sensors failing, the function can continue to be applied by the actuators associated with the controller that is connected to the sensor that is operational.

Although the processor means are described as having a control module and a calculation module, both modules could naturally be incorporated within a single component, e.g. a microcontroller of the powerPC type.

The invention claimed is:

1. A braking system architecture for an aircraft having wheels (1) braked by means of respective brakes (2), each brake having a plurality of electromechanical actuators (3), the braking system having controllers (8) for distributing electric power (Ps) to the actuators (3) in response to a braking setpoint, each controller (8) being associated with some of the actuators of any given brake, the architecture being characterized in that each controller (8) has an input (Ev) for receiving information about the rotary speed of the wheel (1) braked by the actuators associated with said controller, the controller including processor means (13) for modulating the power transmitted to the actuators as a function of the speed of rotation of the wheel in order to provide anti-skid protection.

2. An architecture according to claim 1, wherein the actuators (3) of a given brake (2) are grouped together in first and second complementary actuator groups (3a, 3b) so that the actuators of the first group (3a) are controlled by a first controller (8a) that controls those actuators only and so that the actuators of the second group of actuators (3b) are controlled by a controller (8a) that controls those actuators only, and wherein both of the first and second controllers receive the information about the speed of rotation of the braked wheel (1).

3. An architecture according to claim 2, wherein the first and second controllers (8a, 8b) are both connected directly to a rotary speed sensor (19) that transmits information to them about the speed of rotation of the braked wheel (1).

4. An architecture according to claim 2, wherein the first and second controllers (8a, 8b) are each connected to a different rotary speed sensor of the braked wheel (1), each sensor independently transmitting information to the controller to which it is connected about the speed of rotation of the wheel (1).

* * * * *